US008824852B2

(12) United States Patent
Harvey et al.

(10) Patent No.: US 8,824,852 B2
(45) Date of Patent: Sep. 2, 2014

(54) CABLE CLAMP ASSEMBLY AND METHOD FOR A FLAT FIBER OPTIC CABLE

(75) Inventors: Gerry J. Harvey, Newton, NC (US); William J. Miller, Hickory, NC (US); Benjamin G. Whitener, Newton, NC (US)

(73) Assignee: Corning Cable Systems LLC, Hickory, NC (US)

( * ) Notice: Subject to any disclaimer, the term of this patent is extended or adjusted under 35 U.S.C. 154(b) by 254 days.

(21) Appl. No.: 13/407,257

(22) Filed: Feb. 28, 2012

(65) Prior Publication Data
US 2013/0223808 A1   Aug. 29, 2013

(51) Int. Cl.
*G02B 6/00* (2006.01)
(52) U.S. Cl.
USPC .......................................... 385/136
(58) Field of Classification Search
USPC .......................................... 385/136
See application file for complete search history.

(56) References Cited

U.S. PATENT DOCUMENTS

| 4,939,821 | A | 7/1990 | Frank, Jr. .................. 24/136 R |
| 5,142,745 | A | 9/1992 | Setty et al. ................. 24/136 R |
| 2007/0047884 | A1* | 3/2007 | Storaasli et al. .............. 385/100 |
| 2008/0292253 | A1* | 11/2008 | Keller ........................... 385/101 |
| 2012/0273628 | A1* | 11/2012 | Malin .......................... 248/74.1 |

* cited by examiner

*Primary Examiner* — Jerry Blevins
(74) *Attorney, Agent, or Firm* — Russell S. Magaziner

(57) ABSTRACT

A cable clamp assembly and a cable clamp method for a flat fiber optic cable are disclosed. The assembly includes a wedge-shaped outer shell with a bottom wall having a friction inner surface with a longitudinal central recess formed therein. The flat fiber optic cable resides within the interior of the outer shell and is supported by the friction inner surface. A shim having two parallel rows of protrusions fits within the interior of the outer shell with the protrusions being in contact with the fiber optic cable. The assembly includes a wedge insert having two outer ridges that substantially align with the two rows of protrusions. When the wedge insert matingly engages the outer shell, the outer ridges press down on the protrusions, which in turn press down on the fiber optic cable mainly at the locations where longitudinal dielectric strength members reside.

21 Claims, 9 Drawing Sheets

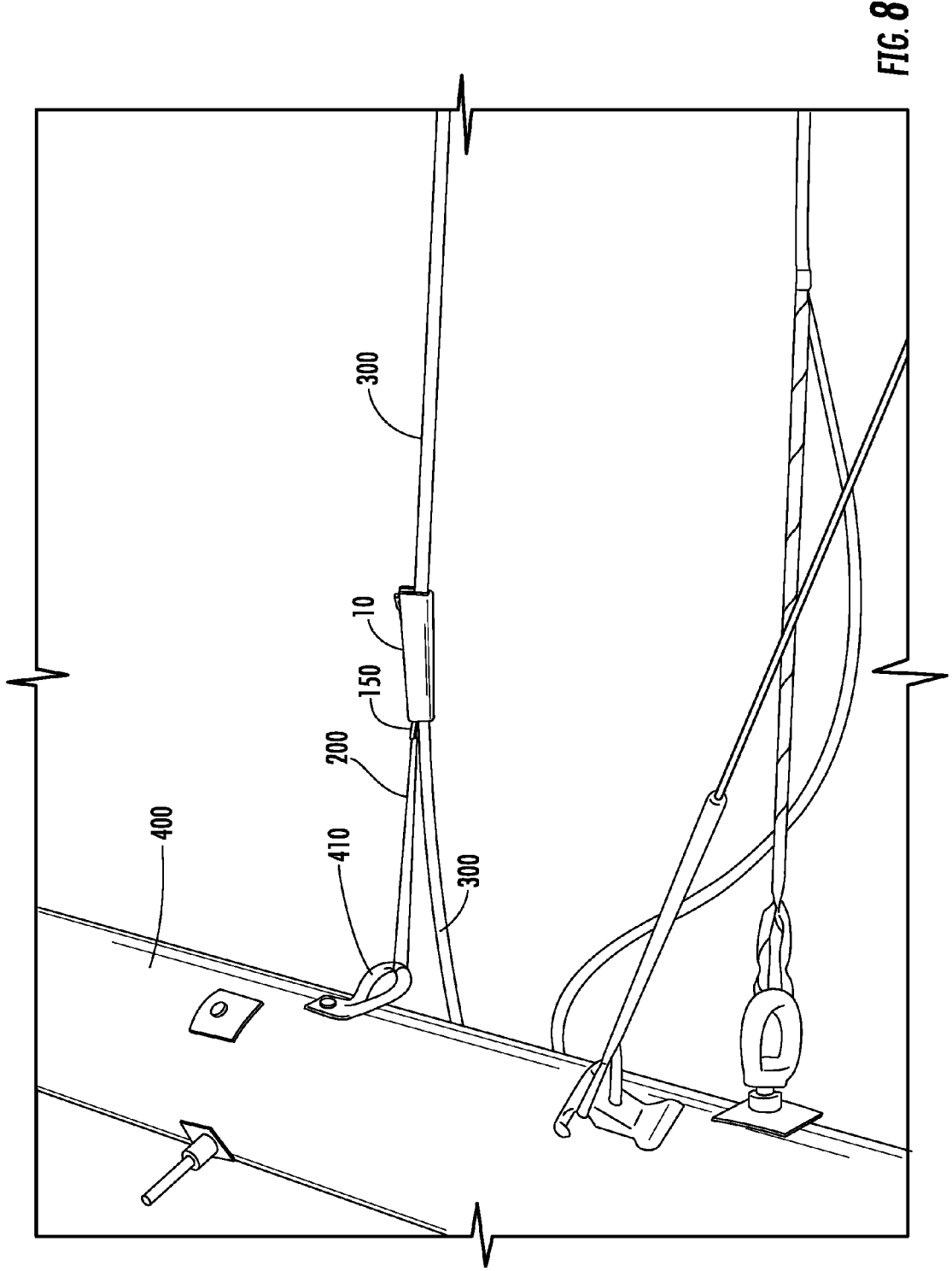

1

CABLE CLAMP ASSEMBLY AND METHOD FOR A FLAT FIBER OPTIC CABLE

FIELD

The present disclosure relates to clamp assemblies for cables, and in particular to a cable clamp assembly and method for securing a flat fiber optic cable.

BACKGROUND

A cable clamp assembly is used in the field to secure a jacketed cable so that it can be attached to a support structure (e.g., a telephone or telecommunications pole) when deploying the cable to another structure (e.g., a building or another support structure). In the case of drop wires, the cable clamps are called drop-wire clamps or drop-wire clamp assemblies.

A cable clamp assembly has a bail cable that attaches to an aerial support fixture on the support structure. The cable clamp assembly is configured to allow the cable to be attached to the aerial support fixture of the support structure in a manner that supports the tension that would otherwise be imparted to the cable and possibly damage the cable. To carry out this function, the cable clamp assembly needs to firmly grip and hold the cable in place under maximum tension without damaging the cable.

Conventional cable clamp assemblies may employ a wedge-shaped insert to which the bail cable attaches and that fits into and snugly engages a wedge-shaped outer shell. The cable passes through the cable clamp assembly between the outer shell and the insert. A shim resides between the cable and the insert and presses into the cable when the insert and shell are matingly engaged. This results in a compressive force on the cable that serves to secure the cable within the cable clamp assembly.

Some conventional cable clamp assemblies are designed for PVC-jacketed copper drop cables or unjacketed conductors having a round cross-sectional shape. Such assemblies cannot provide a sufficient grip on (i.e., cannot apply a sufficient compressive force to) a flat fiber-optic cable without compressing it to the point where the optical fibers contained therein are damaged.

SUMMARY

An aspect of the disclosure is a cable clamp assembly for securing a flat fiber optic cable having flat top and bottom surfaces and two longitudinal dielectric strength members having locations on either side of centrally located optical fibers. The assembly includes a wedged-shaped outer shell having a tapered interior defined in part by a friction inner surface of a bottom wall. The friction inner surface is sized to operably support the bottom surface of the flat fiber optic cable and has a central recess that runs longitudinally and that is substantially aligned with the optical fibers. The assembly also has a shim disposed within the tapered interior of the outer shell. The shim has two substantially parallel rows of protrusions that contact the flat top surface of the flat fiber optic cable. The rows of protrusions are substantially aligned with the two longitudinal dielectric strength members. The assembly also includes a wedge insert having a securing feature for securing a bail cable. The wedge insert has a bottom wall that defines two substantially parallel outer ridges that align with the two substantially parallel rows of protrusions of the shim when the wedge insert slidingly engages and mates with the outer shell. The outer ridges apply a compressive force to the flat fiber optic cable through the protrusions and mainly at the locations of the respective dielectric strength members.

Another aspect of the disclosure is a cable clamp assembly for deploying a flat fiber optic cable. The assembly includes the flat fiber optic cable, which has flat top and bottom surfaces and two longitudinal dielectric strength members having locations on either side of centrally located optical fibers. The assembly also includes a wedge-shaped shell having an interior defined in part by a bottom friction inner surface that has a longitudinal central recess formed therein. The central recess is substantially aligned with the optical fibers when the flat fiber optic cable operably resides in the interior of the shell. The assembly also includes a shim having upper and lower surfaces. The lower surface has two substantially parallel rows of protrusions that contact the flat top surface of the flat fiber optic cable and that are substantially aligned with the two longitudinal dielectric strength members when the flat fiber optic cable operably resides within the interior of the shell. The assembly also has a wedge insert having two longitudinal and substantially parallel outer ridges that substantially align with the two substantially parallel rows of protrusions of the shim. The wedge insert is configured to matingly engage the outer shell and contact the upper surface of the shim, with the outer ridges applying a compressive force to the flat top surface of the flat fiber optic cable through the protrusions and mainly at the locations of the respective strength members within the flat fiber optic cable, thereby securing the flat fiber optic cable between the protrusions and the friction inner surface.

Another aspect of the disclosure is a method of securing a flat fiber optic cable having flat top and bottom surfaces and two longitudinal dielectric strength members having locations on respective sides of centrally located optical fibers. The method includes disposing the flat fiber optic cable in an interior of a wedge-shaped outer shell so that the flat bottom surface rests on a friction inner surface having a central longitudinal recess formed therein, with the optical fibers being substantially aligned with the central recess. The method also includes disposing a shim within the outer shell interior. The shim has two substantially parallel rows of protrusions that contact the flat top surface of the flat fiber optic cable and that are substantially aligned with the two longitudinal dielectric strength members therein. The method further includes slidingly engaging a wedge insert into the outer shell. The wedge insert has a bottom wall that defines two substantially parallel outer ridges that substantially align with the two parallel rows of protrusions of the shim. This causes the outer ridges to apply a compressive force to the flat fiber optic cable through the protrusions and mainly at the locations of the respective dielectric strength members within the flat fiber optic cable.

Additional features and advantages will be set forth in the Detailed Description which follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which:

FIG. 8 is a schematic diagram that shows how the fiber optic cable can be deployed using the clamp assembly, with the cable clamp assembly being attached to an aerial support fixture on a support structure in the form of a utility pole, and with the fiber optic cable secured by the cable clamp assembly.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

The entire disclosure of any publication or patent document mentioned herein is incorporated by reference.

Cartesian coordinates are shown in some of the Figures for the sake of reference and are not intended to be limiting as to direction or orientation.

Figure 1:
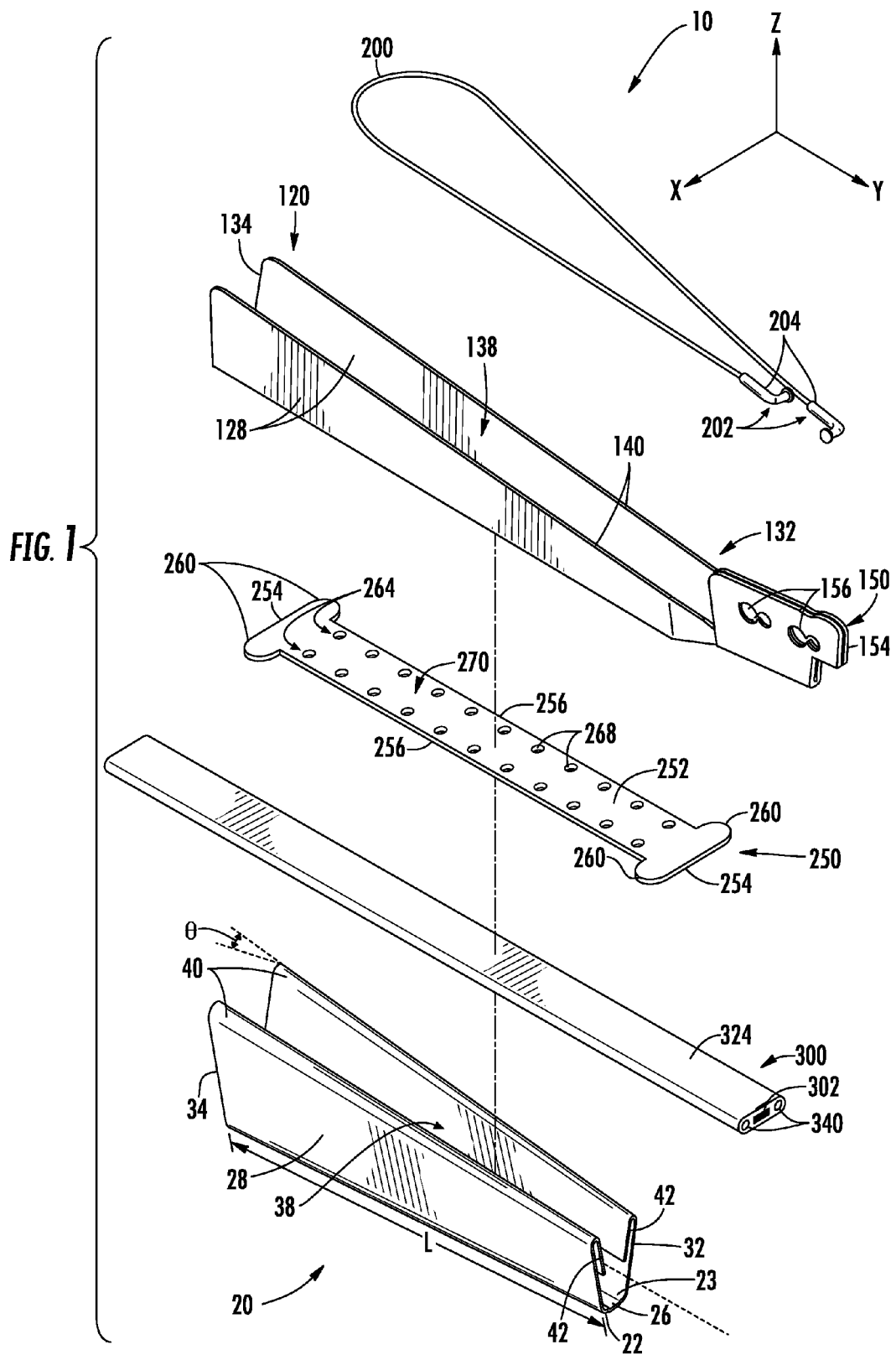
FIG. 1 is an exploded view of an example cable clamp assembly according to an aspect of the disclosure.

FIG. 1 is an exploded view of an example cable clamp assembly ("assembly") 10 according to the disclosure. The assembly 10 includes four main components: a wedge-shaped outer shell 20, a mating wedge-shaped insert ("wedge insert") 120, a bail cable 200, and a shim 250, all configured as described below to secure a flat fiber optic cable 300 so that it can be deployed relative to a support structure.

Figure 2:
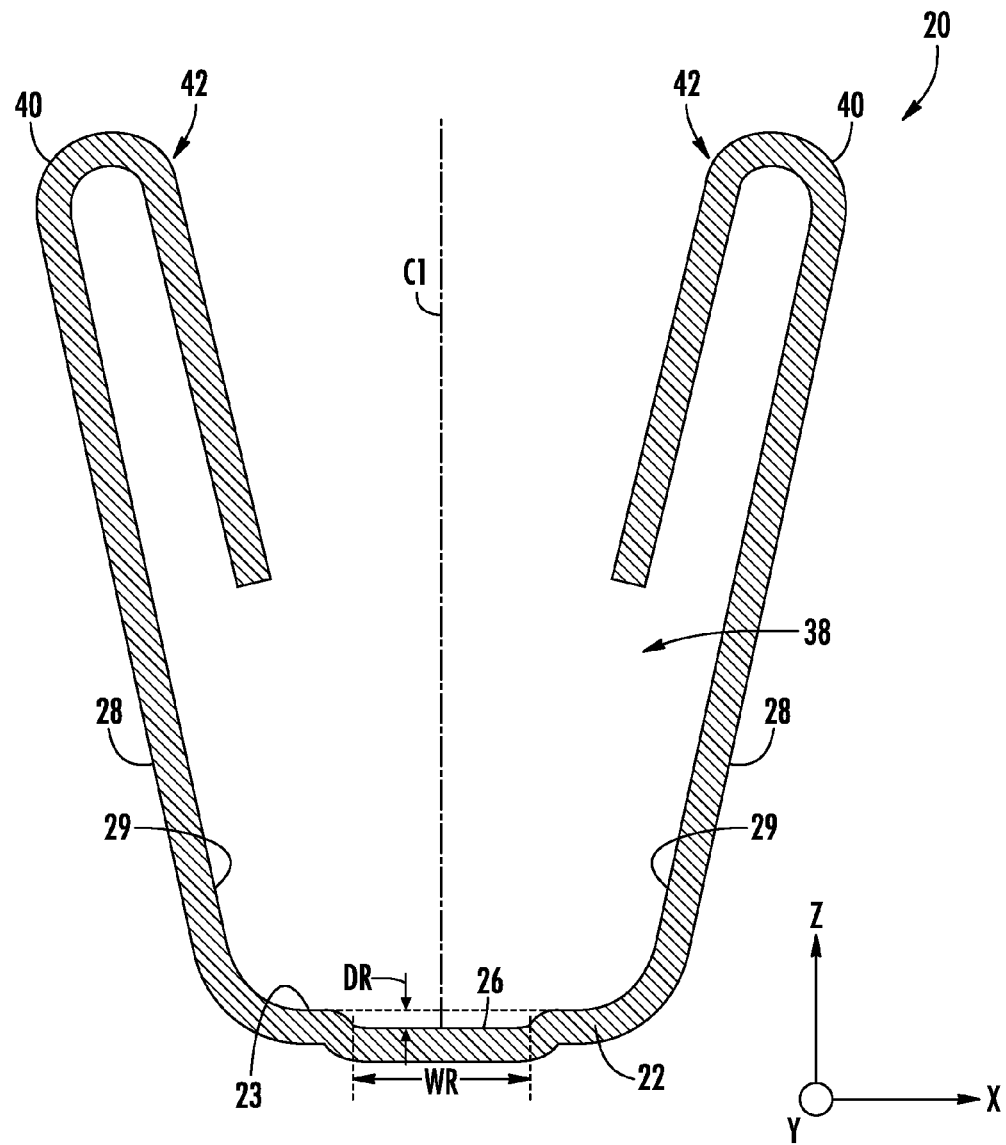
FIG. 2 is a cross-sectional view of the outer shell as taken in the X-Z plane.

FIG. 2 is a cross-sectional view as taken in the X-Z plane of wedge-shaped outer shell 20. A centerline C1 in the Z-direction is shown. An example material for outer shell 20 is a metal, such as stainless steel. The outer shell 20 has a substantially U-shaped cross-section defined by a bottom wall 22 and sidewalls 28. The sidewalls 28 have a height in the Z-direction that changes in the Y-direction, which provides outer shell 20 with its wedge shape. Sidewalls 28 are thus referred to as being "tapered," and have a rake or taper angle θ. In an example, the rake or taper angle θ of sidewalls 28 is 5.5°. In an example, sidewalls 28 are angled slightly away from each other so that outer shell 20 has a linear flare in the Z-direction. The sidewalls 28 have top edges 40 that are inwardly bent to form guides 42, whose function is described below.

The bottom wall 22 and sidewalls 28 define a narrow front end 32 and a wide rear end 34 for outer shell 20. The bottom wall 22 and sidewalls 28 have respective inner surfaces 23 and 29 that define a tapered interior 38. The tapered interior 38 has a constant width in the lateral (X-direction) direction for a given height (Z), but has a height that shortens when traveling along the longitudinal direction (Y-direction) from wide rear end 34 to narrow front end 32. The tapered interior 38 is open at front and rear ends 32 and 34.

The bottom wall 22 includes a central recess 26 that is formed in inner surface 23 and that runs longitudinally, i.e., the central recess runs in the Y-direction and is centered on center line C1. The central recess 26 has a width WR in the X-direction and a depth DR in the Z-direction. An example range for the width WR is from 7.8 mm to 8.6 mm, with an exemplary width WR being 8.2 mm. An example range for the depth DR is from 0.5 mm to 1.5 mm, with an exemplary depth DR being about 1 mm. An example length L of outer shell 20 is at least 5.5 inches.

In an example, interior surface 23 of bottom wall 22 comprises a friction surface, such as a coating of powder-based paint, an abraded surface, or the like, that increases the surface's coefficient of static friction as compared to the bare or untreated material used to form bottom wall 22. The bottom wall interior surface 23 is thus referred to hereinafter as friction inner surface 23. The friction inner surface 23 is sized to operably support a flat surface of flat fiber optic cable 300, as described in greater detail below.

Figure 3:
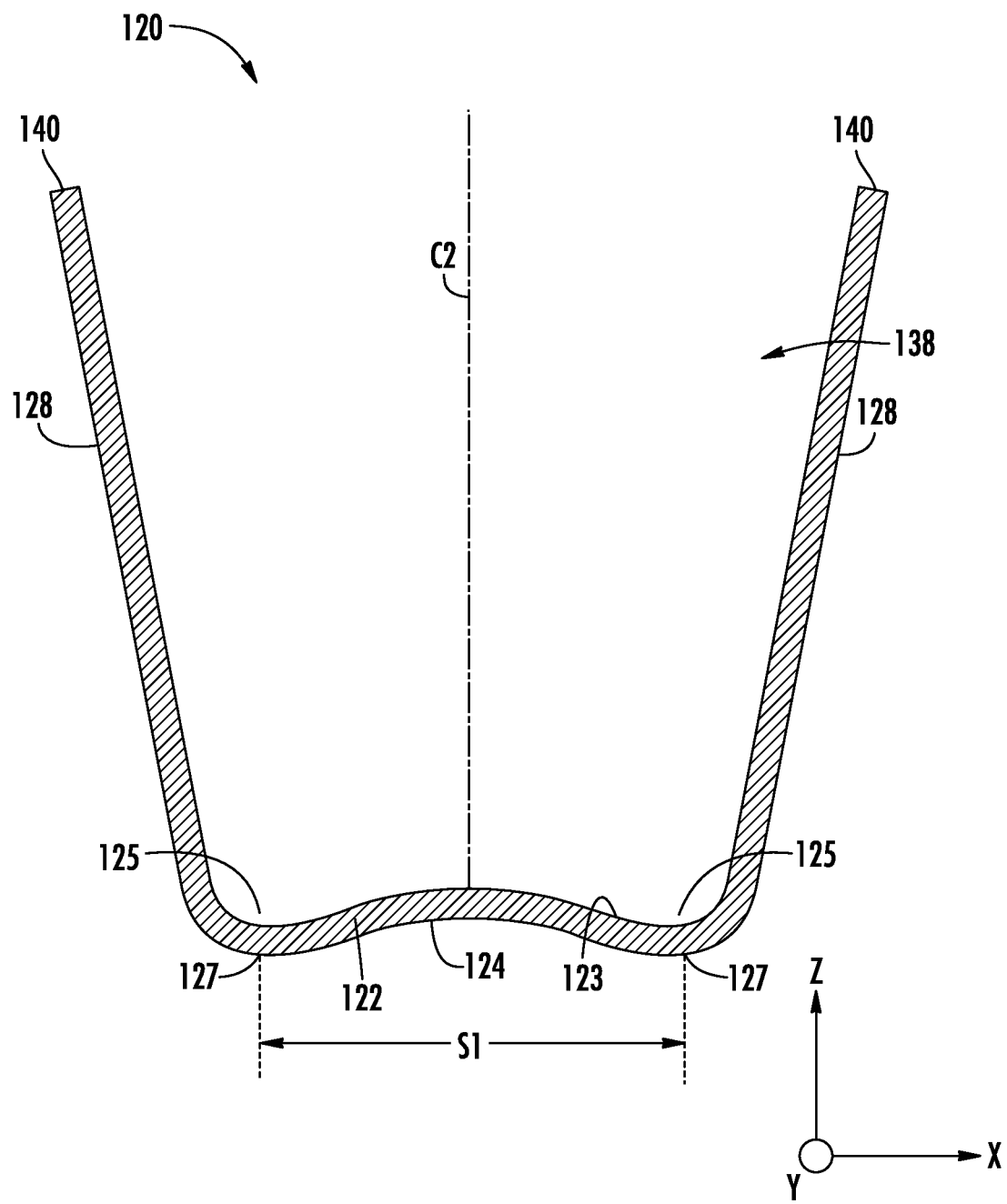
FIG. 3 is a cross-sectional view of the wedge insert as taken in the X-Z plane.

FIG. 3 is a cross-sectional view as taken in the X-Z plane of insert 120. A centerline C2 in the Z-direction is shown. The insert 120 is similar to outer shell 20 in that it also has a substantially U-shaped cross-section with a bottom wall 122 and substantially vertical sidewalls 128 that are tapered and angled slightly away from each other so that wedge insert 120 has a linear flare in the Z-direction. The bottom wall 122 has an inner surface 123 and an outer surface 124.

The bottom wall 122 and sidewalls 128 define a narrow front end 132 and a wide rear end 134. The bottom wall 122 and sidewalls 128 define a tapered interior 138 that has a substantially constant width in the lateral (X-direction) for a given height (Z) but has a height that shortens in the longitudinal direction (Y-direction) from wide rear end 134 to narrow front end 132.

The tapered interior 138 is open at front and rear ends 132 and 134. The sidewalls 128 have flat top edges 140 that fit into respective guides 42 of outer shell 20 when these two components are mated, as described below. The sidewalls 128 have the same or similar taper (rake) angle θ as that of sidewalls 28 of outer shell 20. An example material for insert 120 is a metal, such as stainless steel.

In an example embodiment, bottom wall 122 includes a central curved portion (e.g., is concavely curved relative to tapered interior 138) to define substantially longitudinal, parallel and spaced apart interior wells 125 in inner surface 123. Interior wells 125 define, on the outer surface 124 of bottom wall 122, substantially longitudinal and parallel outer ridges 127. The purpose of outer ridges 127 is described below. In an example, outer ridges 127 have a center-to-center spacing S1 in the range from about 10 mm to about 13 mm, with about 11.4 mm (0.45 inches) being an exemplary value. Here, the term "outer" refers to the ridges being located on the outside of wedge insert 120 and also to the ridges being located away from centerline C2 and more towards sidewalls 128.

With reference again to FIG. 1, wedge insert 120 includes, adjacent front end 132, a securing feature 150 configured so that securing members 202 at respective ends 204 of bail cable 200 can be secured thereto. In an example, securing feature 150 includes a plate 154 that is oriented in the vertical direction (i.e., resides in the Y-Z plane) and that includes notched apertures 156 that accommodate and secure corresponding securing members 202 at ends 204 of bail cable 200. In an example, plate 154 is formed as an integral part of wedge insert 120, e.g., by folding and crimping two flat portions of bottom wall 122 at front end 132. In an example, bail cable 200 is made of flexible stranded steel.

Figure 4:
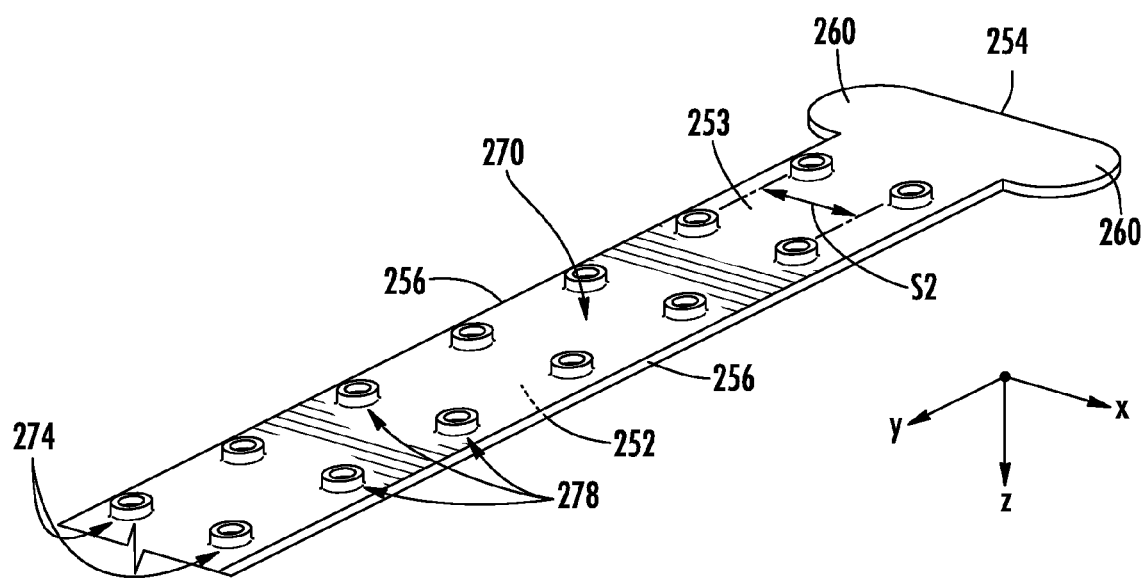
FIG. 4 is a close-up elevated view of an end portion of the bottom of the shim of FIG. 1.

FIG. 4 is close-up elevated view of an end portion of the bottom of the example shim 250 of FIG. 1. The shim 250 comprises a thin and flexible sheet of metal (e.g., stainless steel) having a substantially rectangular shape with opposite upper and lower surfaces 252 and 253, opposite ends 254, and parallel sides 256. The shim 250 has rounded tabs 260 on each of sides 256 at both ends 254. The tabs 260 are configured to capture shim 250 within outer shell 20 in order to limit the shim's longitudinal motion when operably disposed in interior 38 of the outer shell, as discussed in greater detail below.

The example shim 250 includes first and second rows 264 of perforations (apertures) 268 that run parallel to and are adjacent respective sides 256 so that a center portion 270 of the shim running in the Y-direction is solid, i.e., free from perforations. In an example, the first and second rows 264 of perforations 268 have a center-to-center spacing S2 in the range from about 10 mm to about 13 mm, with about 11.4 mm (0.45 inches) being an exemplary value.

The first and second rows 264 of perforations 268 each include on lower surface 253 corresponding first and second rows 274 of protrusions 278. In an example, perforations 268 are punched from upper surface 252 and are simultaneously or later flattened from the bottom to form protrusions 278. The protrusions 278 are thus aligned with perforations 268, so that spacing S2 also corresponds to the center-to-center spacing of protrusions 278.

Figure 5:
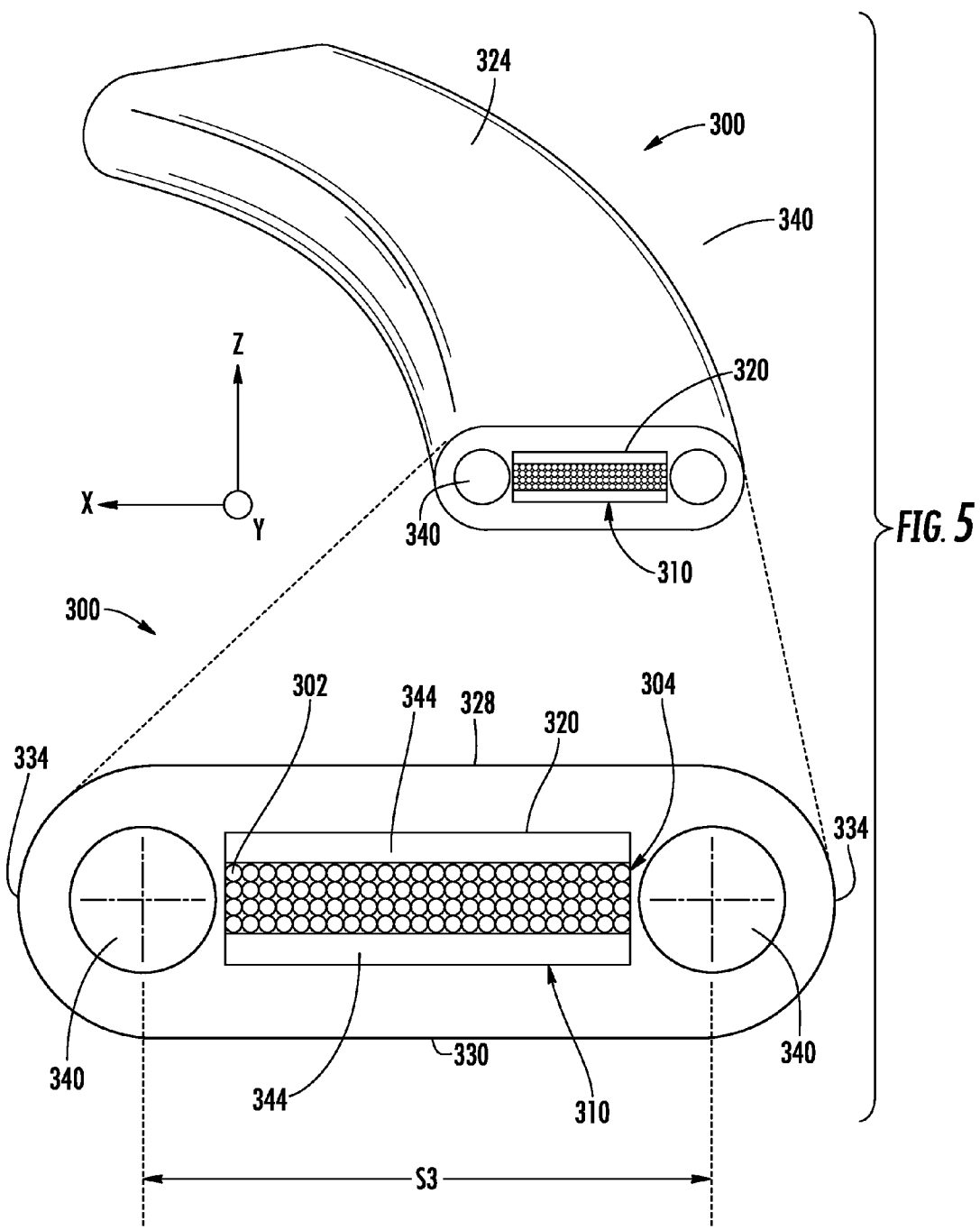
FIG. 5 is a close-up elevated view of an example flat fiber optic cable in the form of a ribbon cable.

FIG. 5 is a close-up elevated view of an example flat fiber optic cable 300 in the form of a ribbon cable, and also shows a close-up cross-sectional view of the flat fiber optic cable. An example flat fiber optic cable 300 is the RPX® ribbon cable, available from Corning Cable Systems, Hickory, N.C. The flat fiber optic cable 300 includes centrally located optical fibers 302. In an example, optical fibers 302 are arranged in a ribbon stack 310 having one or more rows 304 of optical fibers 302, with each row having, for example, 24 optical fibers. Thus, in various examples, flat fiber optic cables 300 can have a ribbon stack 310 that comprises 24 optical fibers 302 in a single row 304 or up to 144 optical fibers in 6 rows. Other configurations for optical fibers 302 can also be employed.

Different flat fiber optic cables 300 can have substantially the same width in the X-direction but can have different heights in the Z-direction, depending on the number of rows 304 of optical fibers 302 in ribbon stack 310. This property allows assembly 10 to accommodate flat fiber optic cables 300 having different numbers of optical fibers 302 by virtue of the assembly employing a wedging force between outer shell 20 and insert 120 to secure the flat fiber optic cable.

The ribbon stack 310 is contained within a central channel 320 of an outer jacket 324. The outer jacket 324 has an elongate cross-sectional shape in the X-direction. An exemplary outer jacket 324 is made of polyethylene (PE). The outer jacket 324 supports first and second dielectric strength members 340 that are located on opposite sides of central channel 320 along the X-direction and that longitudinally run down flat fiber optic cable 300 in the Y-direction, i.e., alongside of and parallel to the central channel. A water-swellable tape 344 may be included in central channel 320 on the top and bottom of ribbon stack 310, as shown.

An example outer jacket 324 has a race-track cross-sectional shape that includes opposite (top and bottom) flat surfaces 328 and 330, and opposite (left and right) rounded edges 334. The dielectric strength members 340 have a center-to-center spacing S3. An example spacing S3 is in the range from about 10 mm to about 13 mm, with about 11.4 mm (0.45 inches) being an exemplary value. In an example embodiment, spacing S1 between outer ridges 127, spacing S2 between protrusions 278, and spacing S3 between dielectric strength members 340 are substantially equal.

Figure 6:
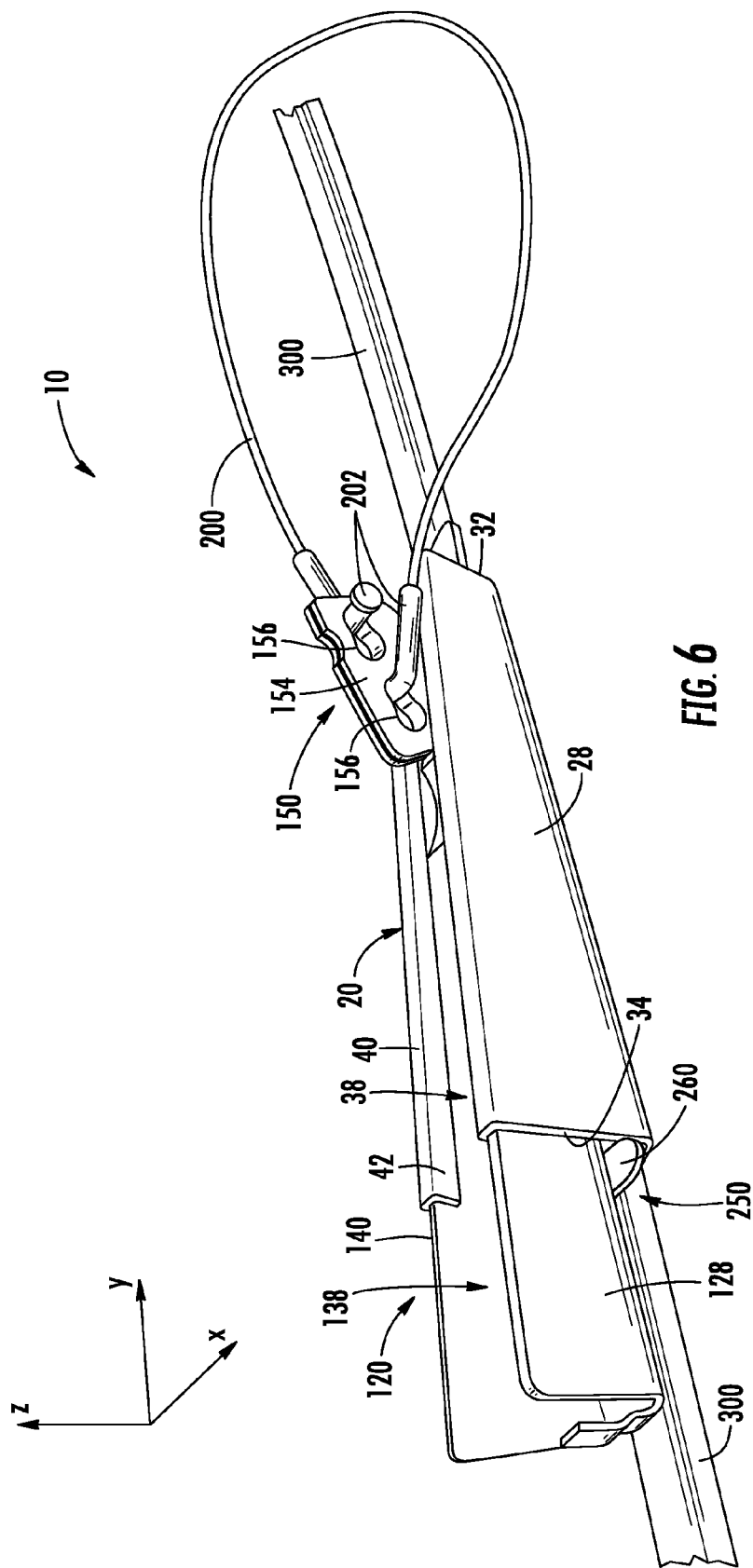
FIG. 6 is an elevated view of an example assembly in the process of being assembled to secure the flat fiber optic cable.

FIG. 6 is an elevated view of an example assembly 10 in the process of being assembled to secure flat fiber optic cable 300. In an example, assembly 10 is assembled by first introducing flat fiber optic cable 300 into tapered interior 38 of outer shell 20 so that the cable's flat bottom surface 330 is in contact with friction inner surface 23 of bottom wall 22. The shim 250 is then placed atop flat top surface 328 of flat fiber optic cable 300, with shim lower surface 253 adjacent the flat top surface. The tabs 260 at opposite ends 254 serve to capture shim 250 within tapered interior 38 of outer shell 20 and prevent the shim from moving longitudinally therein. When shim 250 is operably disposed in this manner, protrusions 278 of shim 250 substantially align in the Z-direction with the respective dielectric strength members 340 within flat fiber optic cable 300.

The wedge insert 120 is then inserted into outer shell 20 so that the top edges 140 of its sidewalls 128 engage guides 42 of the outer shell. As shown in FIG. 6, when insert 120 is initially engaged with outer shell 20 with minimal force, just over half of the insert resides within the outer shell while the remaining portion extends from rear end 34 of the outer shell. The insert 120 is configured to substantially completely reside within and be matingly engaged with outer shell 20 when assembly 10 is operating at its maximum tension.

Note that at this point outer ridges 127 of insert 120 are substantially aligned in the Z-direction with corresponding rows 264 of perforations 268 and rows 274 of protrusions 278, which are in turn substantially aligned in the Z-direction with dielectric strength members 340 of flat fiber optic cable 300.

Figure 7A:
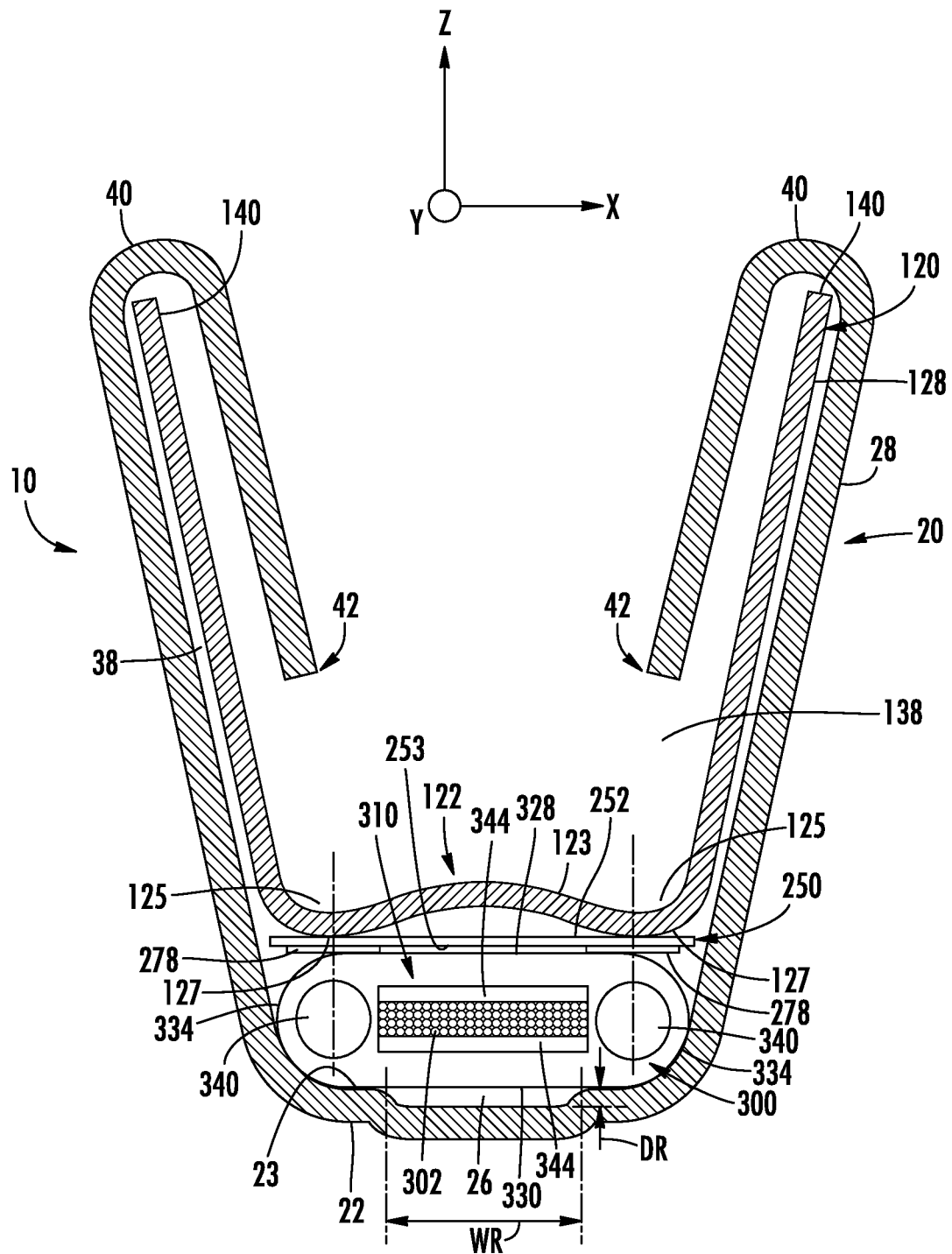
FIG. 7A is a cross-sectional view of the cable clamp assembly as assembled with the flat fiber optic cable secured therein.

FIG. 7A is a cross-sectional view of assembly 10 as assembled with flat fiber optic cable 300 secured therein. As wedge insert 120 moves deeper into outer shell 20 under the application of force (e.g., as applied by field personnel), outer ridges 127 of the wedge insert slide over the corresponding portion of upper surface 252 of shim 250 while simultaneously moving downward against the shim by virtue of the wedge configuration. This motion causes outer ridges 127 to firmly press down on rows 274 of protrusions 278 of shim lower surface 253, which pushes the protrusions into flat top surface 328 of flat fiber optic cable 300. Because protrusions 278 are substantially aligned with dielectric strength members 340 within flat fiber optic cable 300, the compressive force provided by outer ridges 127 of wedge insert 120 is distributed mainly at the locations of the dielectric strength members while leaving the central portion of the flat fiber optic cable that contains ribbon stack 310 substantially uncompressed in comparison.

The flat fiber optic cable 300 is thus squeezed between protrusions 278 and friction inner surface 23. The protrusions 278 dig in slightly to flat top surface 328 of flat fiber optic cable 300, which serves to grip the flat fiber optic cable and hold it in place. In addition, the friction from friction inner surface 23 against flat bottom surface 330 of the flat fiber optic cable 300, in combination with the compressive force that pushes the flat bottom surface and friction inner surface together, also serves to grip the flat fiber optic cable and hold it in place.

The assembly 10 is thus configured to apply most of the compressive retaining force directed to flat fiber optic cable 300 to where the flat fiber optic cable is strongest in order to alleviate any compressive force where the flat fiber optic cable is weakest, thereby preserving the integrity of the ribbon stack.

Figure 7B:
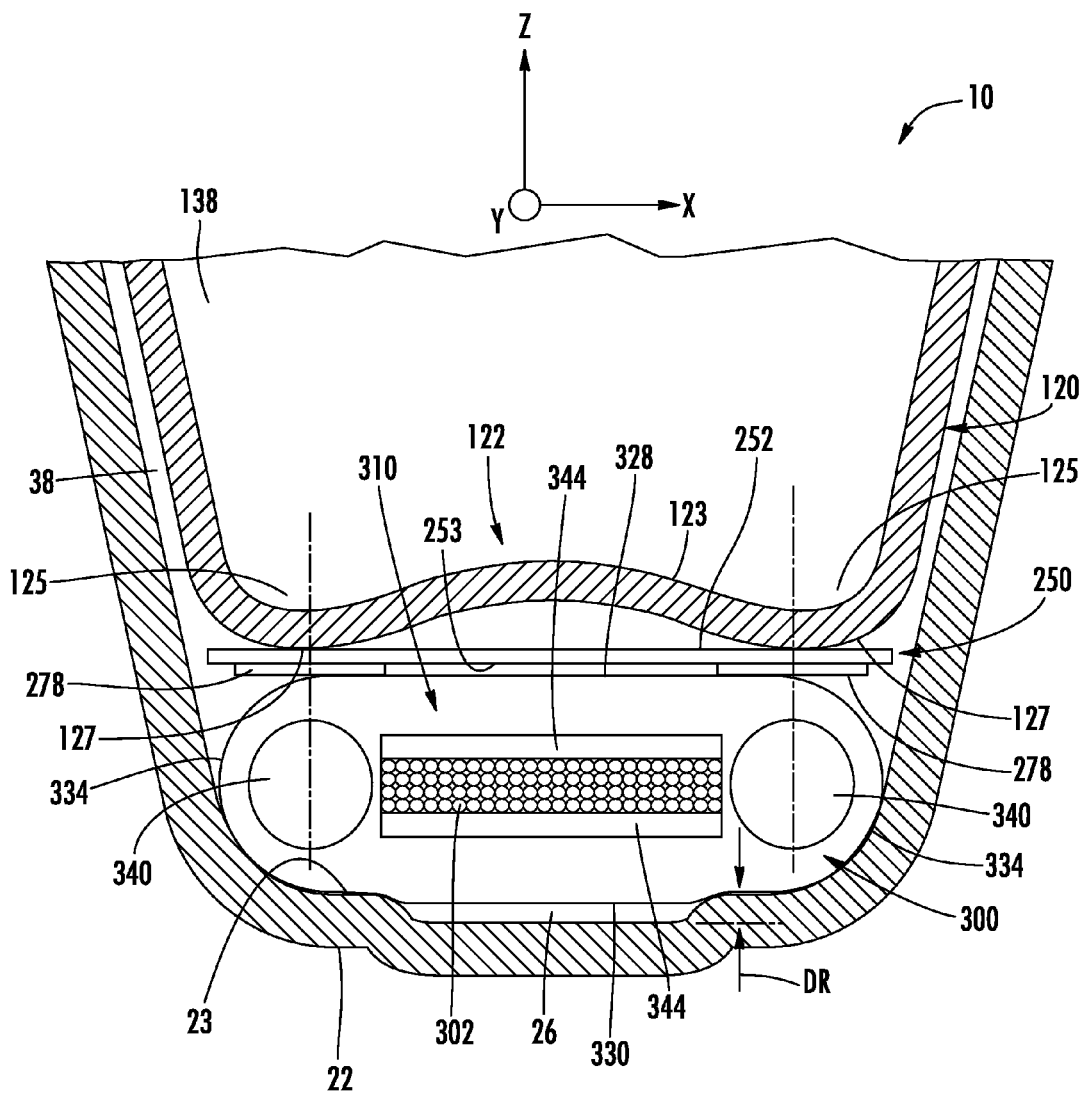
FIG. 7B is a close-up view of the bottom portion of the cross-section of FIG. 7A showing an example of how the flat bottom surface of the jacket of the flat fiber optic cable can deform into the central recess when subjected to the compressive force of the wedge insert.

FIG. 7B is a close-up view of the bottom portion of the cross-section of FIG. 7A. Note that central recess 26 formed in friction inner surface 23 of bottom wall 22 of outer shell 20 serves as a pressure relief feature that allows the portion of flat bottom surface 330 that lies directly underneath optical fibers 302 to deform into the central recess. This reduces the amount by which central channel 320 of outer jacket 324 collapses under the compressive force provided by wedge insert 120. This in turn prevents damage to optical fibers 302 in ribbon stack 310. In an example, central recess 26 prevents central channel 320 from catastrophically collapsing under the compressive force provided by wedge insert 120.

Thus, an aspect of the disclosure is directed to a method of securing flat fiber optic cable 300 using assembly 10. The method includes disposing flat fiber optic cable 300 in tapered interior 38 of outer shell 20 so that its flat bottom surface 330 rests on friction inner surface 23, which has the aforementioned central longitudinal recess 26 formed therein. The optical fibers 302 contained within flat fiber optic cable 300 are substantially aligned with central recess 26. The method also includes disposing shim 250 within outer shell interior 38. The shim 250 has the aforementioned two substantially parallel rows of protrusions 278 that contact flat top surface 328 of flat fiber optic cable 300, and that are substantially aligned with dielectric strength members 340 therein. The method also includes slidingly engaging wedge insert 120 into outer shell 20, with outer ridges 127 of the wedge insert applying a compressive force to flat fiber optic cable 300 through protrusions 278 and mainly at the location of the respective dielectric strength members 340 within the flat fiber optic cable.

With reference now to FIG. 8, assembly 10 is used to deploy flat fiber optic cable 300 by attaching the assembly to a support structure 400, which is shown by way of example as a utility pole. This attachment is accomplished in one example by feeding one end 204 of bail cable 200 through an aerial support fixture 410 (shown by way of example as an eye loop) that is attached to support structure 400, thereby operably engaging the bail cable with the aerial support structure.

Both ends 204 of bail cable 200 are then secured to securing feature 150 of wedge insert 120 by engaging securing features 202 within notched apertures 156. The assembly 10, with flat fiber optic cable 300 secured therein, is then suspended from aerial support fixture 410. This serves to transfer the tensile load from flat fiber optic cable 300 to support structure 400 while allowing the flat fiber optic cable to be suspended as it is deployed to the next support structure (not shown).

The assembly 10 is configured to provide a sufficient compressive force on flat fiber optic cable 300 to hold the flat fiber optic cable under high tension without damaging optical fibers 302 contained therein. Industry standard tests for all-dielectric self-supporting (ADSS) type fiber cable fixtures include a test where the cable is tensioned to a maximum installation load. The test calls for heating the cable clamp assembly to 60° C. for 24 hours. This test replicates real-world temperatures experienced by cable clamp assemblies installed in direct sunlight in a hot climate.

Prior art cable clamp assemblies, such as copper drop-line clamp assemblies and stranded conductor wedge clamp assemblies, were tested under the above-stated conditions and did not meet the elevated temperature requirement when used with flat fiber optic cable 300. On the other hand, cable clamp assembly 10 as disclosed herein passed the aforementioned industry standard test when used with flat fiber optic cable 300.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A cable clamp assembly for securing a flat fiber optic cable having flat top and bottom surfaces and two longitudinal dielectric strength members having locations on either side of centrally located optical fibers, comprising:
   a wedged-shaped outer shell having a tapered interior defined in part by a friction inner surface of a bottom wall, the friction inner surface being sized to operably support the bottom surface of the flat fiber optic cable and having a central recess that runs longitudinally and that is substantially aligned with the optical fibers;
   a shim disposed within the tapered interior of the outer shell and having two substantially parallel rows of protrusions that contact the flat top surface of the flat fiber optic cable, with the rows of protrusions being substantially aligned with the two longitudinal dielectric strength members; and
   a wedge insert having a securing feature for securing a bail cable and further having a bottom wall that defines two substantially parallel outer ridges that align with the two substantially parallel rows of protrusions of the shim when the wedge insert slidingly engages and mates with the outer shell, with the outer ridges applying a compressive force to the flat fiber optic cable through the protrusions and mainly at the locations of the respective dielectric strength members, wherein the two outer ridges are defined by the bottom wall of the wedge insert being curved.

2. The assembly according to claim 1, further comprising the flat fiber optic cable.

3. The assembly according to claim 2, wherein the optical fibers comprise a ribbon stack having one or more rows of the optical fibers.

4. The assembly according to claim 2, wherein the flat fiber optic cable comprises a polyethylene jacket that defines the flat top and bottom surfaces and that includes a central channel that contains the optical fibers.

5. The assembly according to claim 4, wherein the optical fibers are configured in a ribbon stack, and wherein the central channel includes water-swellable tape operably arranged relative to the ribbon stack.

6. A cable clamp assembly for securing a flat fiber optic cable having flat top and bottom surfaces and two longitudinal dielectric strength members having locations on either side of centrally located optical fibers, comprising:
   a wedged-shaped outer shell having a tapered interior defined in part by a friction inner surface of a bottom wall, the friction inner surface being sized to operably support the bottom surface of the flat fiber optic cable and having a central recess that runs longitudinally and that is substantially aligned with the optical fibers, wherein the friction inner surface of the bottom wall of the outer shell comprises a powder-based paint;

a shim disposed within the tapered interior of the outer shell and having two substantially parallel rows of protrusions that contact the flat top surface of the flat fiber optic cable, with the rows of protrusions being substantially aligned with the two longitudinal dielectric strength members; and a wedge insert having a securing feature for securing a bail cable and further having a bottom wall that defines two substantially parallel outer ridges that align with the two substantially parallel rows of protrusions of the shim when the wedge insert slidingly engages and mates with the outer shell, with the outer ridges applying a compressive force to the flat fiber optic cable through the protrusions and mainly at the locations of the respective dielectric strength members.

7. The assembly according to claim 6, further comprising the flat fiber optic cable.

8. The assembly according to claim 7, wherein the optical fibers comprise a ribbon stack having one or more rows of the optical fibers.

9. The assembly according to claim 7, wherein the flat fiber optic cable comprises a polyethylene jacket that defines the flat top and bottom surfaces and that includes a central channel that contains the optical fibers.

10. The assembly according to claim 9, wherein the optical fibers are configured in a ribbon stack, and wherein the central channel includes water-swellable tape operably arranged relative to the ribbon stack.

11. A cable clamp assembly for deploying a flat fiber optic cable, comprising:

the flat fiber optic cable, with the flat fiber optic cable having flat top and bottom surfaces and two longitudinal dielectric strength members having locations on either side of centrally located optical fibers;

a wedge-shaped shell having an interior defined in part by a bottom friction inner surface that has a longitudinal central recess formed therein, the central recess being substantially aligned with the optical fibers when the flat fiber optic cable operably resides in the interior;

a shim having upper and lower surfaces, with the lower surface having two substantially parallel rows of protrusions that contact the flat top surface of the flat fiber optic cable and that are substantially aligned with the two longitudinal dielectric strength members when the flat fiber optic cable operably resides within the interior; and a wedge insert having two longitudinal and substantially parallel outer ridges that substantially align with the two substantially parallel rows of protrusions of the shim, the wedge insert being configured to matingly engage the outer shell and contact the upper surface of the shim, with the outer ridges applying a compressive force to the flat top surface of the flat fiber optic cable through the protrusions and mainly at the locations of the respective strength members within the flat fiber optic cable, thereby securing the flat fiber optic cable between the protrusions and the friction inner surface, wherein the outer ridges are defined by the bottom wall of the wedge insert being curved.

12. The assembly according to claim 11, wherein the optical fibers comprise a ribbon stack having one or more rows of the optical fibers.

13. The assembly according to claim 11, wherein the flat fiber optic cable comprises a polyethylene jacket that defines the flat top and bottom surfaces and that includes a central channel that contains the optical fibers.

14. The assembly according to claim 11, further comprising the wedge insert having a securing feature configured to secure a bail cable to the wedge insert.

15. A cable clamp assembly for deploying a flat fiber optic cable, comprising:

the flat fiber optic cable, with the flat fiber optic cable having flat top and bottom surfaces and two longitudinal dielectric strength members having locations on either side of centrally located optical fibers;

a wedge-shaped shell having an interior defined in part by a bottom friction inner surface that has a longitudinal central recess formed therein, the central recess being substantially aligned with the optical fibers when the flat fiber optic cable operably resides in the interior;

a shim having upper and lower surfaces, with the lower surface having two substantially parallel rows of protrusions that contact the flat top surface of the flat fiber optic cable and that are substantially aligned with the two longitudinal dielectric strength members when the flat fiber optic cable operably resides within the interior; and a wedge insert having two longitudinal and substantially parallel outer ridges that substantially align with the two substantially parallel rows of protrusions of the shim, the wedge insert being configured to matingly engage the outer shell and contact the upper surface of the shim, with the outer ridges applying a compressive force to the flat top surface of the flat fiber optic cable through the protrusions and mainly at the locations of the respective strength members within the flat fiber optic cable, thereby securing the flat fiber optic cable between the protrusions and the friction inner surface, the outer ridges having a spacing S1, the two substantially parallel rows of protrusions having a spacing S2, the two longitudinal dielectric strength members having a spacing S3, and wherein the spacings S1, S2 and S3 are substantially equal to 0.45 inches.

16. The assembly according to claim 15, wherein the optical fibers comprise a ribbon stack having one or more rows of the optical fibers.

17. The assembly according to claim 15, wherein the flat fiber optic cable comprises a polyethylene jacket that defines the flat top and bottom surfaces and that includes a central channel that contains the optical fibers.

18. The assembly according to claim 15, further comprising the wedge insert having a securing feature configured to secure a bail cable to the wedge insert.

19. A cable clamp assembly for deploying a flat fiber optic cable, comprising:

the flat fiber optic cable, with the flat fiber optic cable having flat top and bottom surfaces and two longitudinal dielectric strength members having locations on either side of centrally located optical fibers;

a wedge-shaped shell having an interior defined in part by a bottom friction inner surface that has a longitudinal central recess formed therein, the central recess being substantially aligned with the optical fibers when the flat fiber optic cable operably resides in the interior;

a shim having upper and lower surfaces, with the lower surface having two substantially parallel rows of protrusions that contact the flat top surface of the flat fiber optic cable and that are substantially aligned with the two longitudinal dielectric strength members when the flat fiber optic cable operably resides within the interior;

a wedge insert having two longitudinal and substantially parallel outer ridges that substantially align with the two substantially parallel rows of protrusions of the shim, the wedge insert being configured to matingly engage the outer shell and contact the upper surface of the shim, with the outer ridges applying a compressive force to the flat top surface of the flat fiber optic cable through the protrusions and mainly at the locations of the respective strength members within the flat fiber optic cable, thereby securing the flat fiber optic cable between the protrusions and the friction inner surface, the wedge insert having a securing feature configured to secure a bail cable to the wedge insert; and the bail cable, with the bail cable having securing members that are secured to the securing feature of the wedge insert.

20. The assembly according to claim 19, wherein the optical fibers comprise a ribbon stack having one or more rows of the optical fibers.

21. The assembly according to claim 19, wherein the flat fiber optic cable comprises a polyethylene jacket that defines the flat top and bottom surfaces and that includes a central channel that contains the optical fibers.

\* \* \* \* \*